Figure 1:
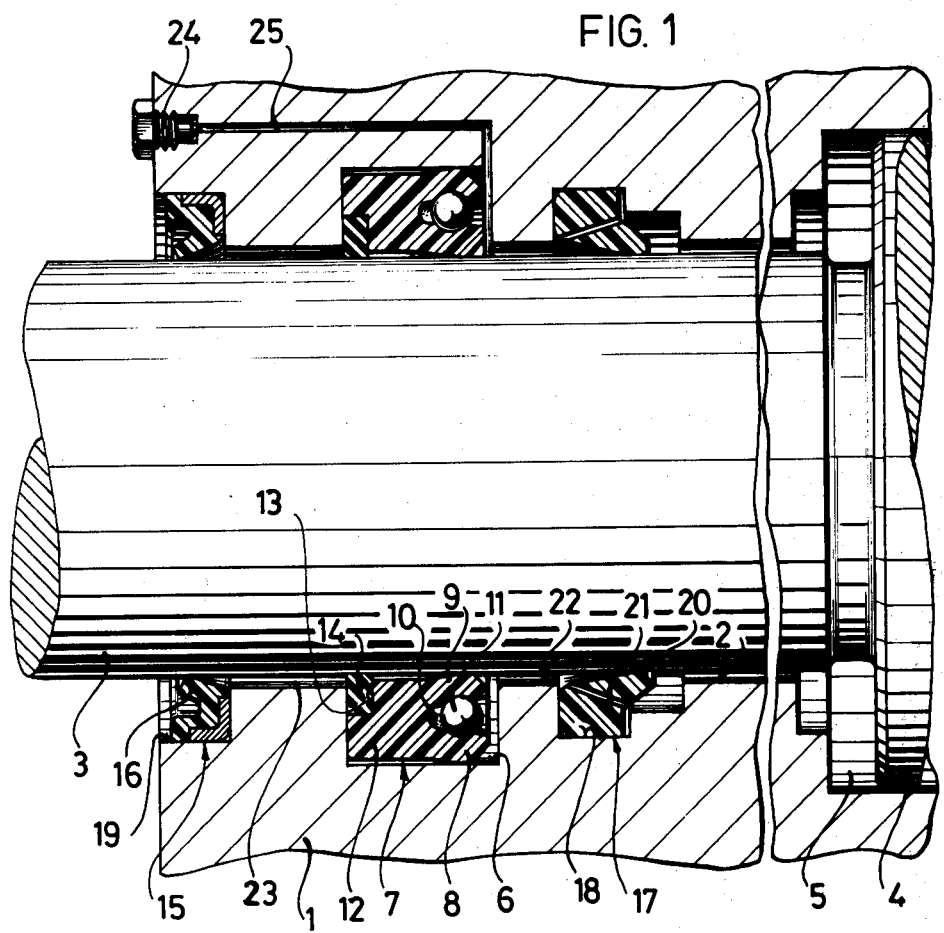

United States Patent [19]

Bertram et al.

[11] 4,284,280
[45] Aug. 18, 1981

[54] SEALING FOR MACHINE ELEMENTS WHICH MOVE BACK AND FORTH

[75] Inventors: Claus Bertram, Waltrop; Georg M. Lorenz, Königstein, both of Fed. Rep. of Germany

[73] Assignee: O & K Orenstein & Koppel Aktiengesellschaft and Lorenz GmbH, Berlin, Fed. Rep. of Germany

[21] Appl. No.: 86,481

[22] Filed: Oct. 19, 1979

[30] Foreign Application Priority Data

Oct. 21, 1978 [DE] Fed. Rep. of Germany ....... 2845920

[51] Int. Cl.³ .............................................. F16J 15/32
[52] U.S. Cl. ........................................ 277/27; 277/59; 277/70
[58] Field of Search .................... 277/3, 24, 27, 70, 75, 277/59, 215

[56] References Cited

U.S. PATENT DOCUMENTS

| 3,214,182 | 10/1965 | Herbruggen | 277/215 |
| 3,642,290 | 2/1972 | Millsap | 277/24 |
| 3,659,306 | 5/1972 | Stoltze | 277/24 |
| 3,738,665 | 6/1973 | Bilco | 277/27 |
| 3,955,859 | 5/1976 | Stella et al. | 277/70 |

*Primary Examiner*—Robert I. Smith
*Attorney, Agent, or Firm*—Martin A. Farber

[57] ABSTRACT

A sealing for back and forth moving machine elements, particularly for the sealing of rods for hydraulic cylinders, with a seal which seals against the housing as well as against the axially back and forth moving machine part, a preceding protection element which is arranged between the seal and the pressurized chamber of the cylinder, and a stripper, which stripper is turned toward the atmosphere. The preceding protection element is provided with a lip, the lip being directed toward the oil pressurized chamber, which lip touches the back and forth moving piston rod and has openings, which openings produce a connection between the pressurized oil chamber and that oil chamber which is formed between the preceding protection element and the lip seal.

6 Claims, 4 Drawing Figures

SEALING FOR MACHINE ELEMENTS WHICH MOVE BACK AND FORTH

The invention relates to a sealing for back and forth moving machine elements, particularly for the sealing of rods for hydraulic cylinders, with a seal which seals against the housing as well as against the axially back and forth moving machine part, an additional sealing element which is arranged between the seal and the pressurized chamber of the cylinder, and a stripper, which stripper is turned toward the atmosphere.

With machine elements, such as for example pistons of hydraulic units or other operating devices with piston rods led out unilaterally, or respectively, bilaterally to which pressure is applied, there occur, as a result of the different working directions as well as the different operating speeds of the back and forth moving part and of the continuously or constantly changing pressure differences between pressure chamber and atmosphere, disadvantageous influences on the seal, which influences lead to damages and leakiness.

With a known sealing arrangement, with which a wiping ring follows the outlet side of a conventional lip seal, an additional ring with a rectangular or square cross-section precedes the lip seal in order to prevent impairment of the sealing action as a consequence of too little prestress with "zero pressure". The preceding ring with rectangular cross-section has the objective to maintain the lowest pressure which is necessary for the sealing in front of the seal. As a consequence of pressure build-up between the ring with rectangular cross-section and the sealing element (drag pressure), deformations and damage to the rectangular ring occur, which lead to the failure of the entire sealing system.

The invention is based on the task to eliminate the preceding disadvantages of the known seals and to achieve an improvement of seals for back and forth moving machine elements in the manner that the destruction of the seal lips by particles of dirt carried along in the oil is prevented. Moreover it is intended to prevent the seal from vibration as a result of pressure pulsation, or respectively, of rapid pressure change or fluctuation. Moreover it should be avoided that seal damages arise through the influence of small air-gas bubbles.

The solution of this task in accordance with the invention results in the manner that a preceding protection element is provided with a lip, the lip being directed toward the oil pressurized chamber, which lip touches the back and forth moving piston rod and has openings, which openings produce a connection between the pressurized oil chamber and the oil chamber, which oil chamber is formed between the preceding protection element and the lip seal.

Figure 2:
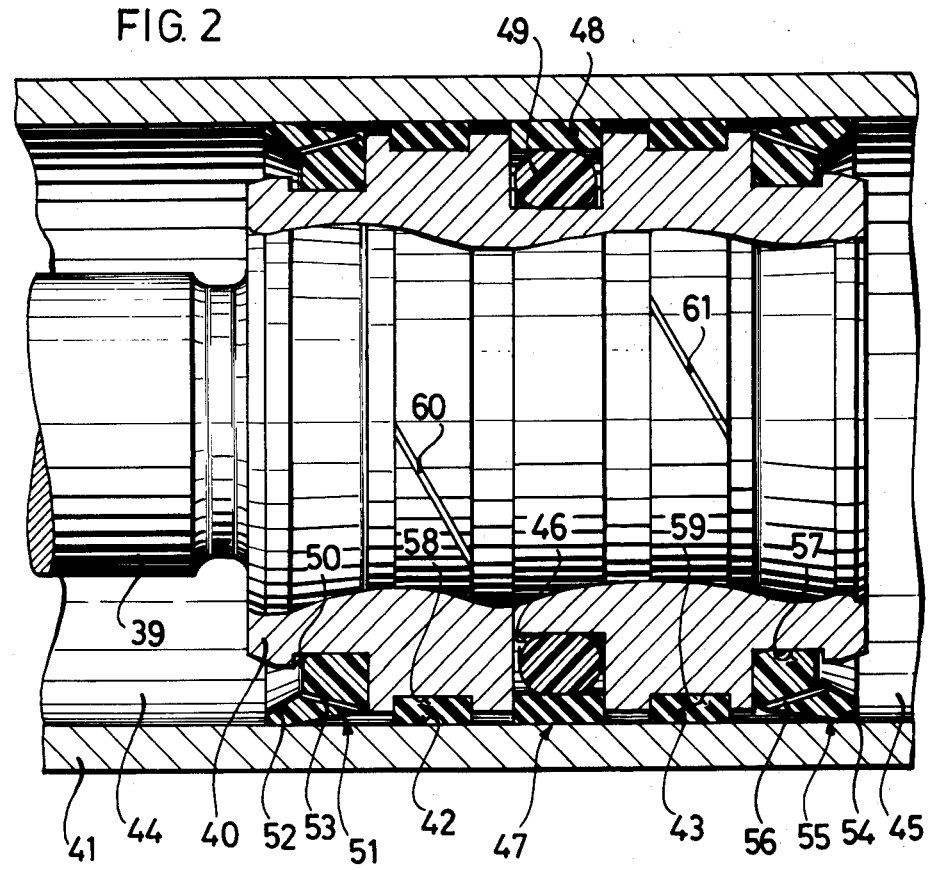
Figure 3:
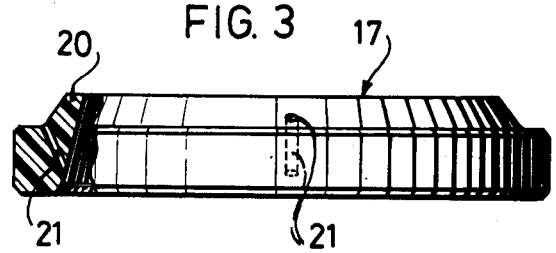
Figure 4:
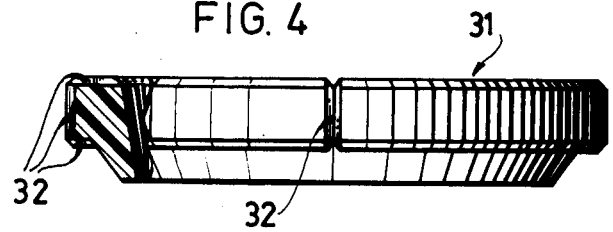

The embodiment examples are illustrated in the drawings. It shows:

FIG. 1—a longitudinal section through a sealing system surrounding or encircling a rod and accommodated in the housing of a working cylinder;

FIG. 2—a longitudinal section through the sealing system of a piston, which sealing system contains the protective element in accordance with the invention;

FIG. 3—a side view of the protection element of FIG. 1 with a partial section of the lip with equalization bore;

FIG. 4—is a view of the protective element in radial direction with a partial section of the lip with slots on the outer periphery.

A guide bore 2 is arranged in the housing 1, in which guide bore a piston rod 3 moves back and forth, which piston rod is acted upon by a piston 4. By means of a lip seal 7 the piston rod 3 is essentially sealed against the pressure which occurs in the oil pressure chamber 5 upon application of the piston 4, the lip seal 7 being arranged in the groove 6 of the housing 1. This seal comprises the sealing lip 8 which is directed towards the housing 1, the sealing lip 9 which is directed against the rod, an oval groove 10, a pretension element 11, the latter causing a pretension or initial biasing of the sealing lips 8 and 9, a sealing body 12, an annular-shaped groove 13 and the support ring 14 which is inserted in the groove 13. A dirt wiper or stripper 15 is arranged in a groove 19 of the housing 1 and possesses a stripping or wiping lip 16 that is directed toward the atmosphere, by means of which sealing lip the dirt which sticks onto the piston rod 3 is stripped off. Between the oil pressure chamber 5 and the lip seal 7 a protection element 17 is arranged in a groove 18 of the housing 1. The protection element 17 which is made of elastomer or elastomeric material contains a lip 20 which is directed toward or against the piston rod 3 and the oil pressure space 5 and contains the essentially axially arranged equalization bores 21. Instead of the equalization bores 21 also, as shown in FIG. 4, notches or grooves 32, which serve for the equalization of the pressure, can be applied in a protection element 31. Before going into operation the oil chamber 22 is vented or bled via the bore 25 by means of the venting or release screw 24.

FIG. 2 shows a piston 40 which is guided in a cylinder housing 41 by means of piston guide rings 42 and 43, which rings each contain a slot or notch 60, and respectively, 61. The piston guide rings are arranged in the piston grooves 58 and 59. The sealing of the pressure chambers 44 and 45 against each other takes place essentially by means of the piston seal (or packing) 47, which seal is inserted in the groove 46 in the piston, which seal comprises a sealing ring 48 and a pretension or biasing element 49. The protection element 51 is arranged in the groove 50 at the end of the piston 40, which end is directed toward the pressure chamber 44, the protection element 51 being provided with equalization holes 53, which equalization holes 53 are essentially or substantially directed axially. The protection element 55 which is arranged in the piston groove 57 contains equalization holes 56 and with its lip 54 is directed toward the pressure chamber 45.

The mode of operation is as follows:

The dirt wiper 15 (FIG. 1) with its elastic stripping lip 16 in the atmosphere direction lies on the axially back and forth moving piston rod 3. The dirt wiper serves to prevent the penetration of solid dirt particles as well as water and so forth into the interior of the hydraulic, or respectively, pneumatic system. The protection attained by means of the dirt wiper 15 refers to the soiling of the pressure medium, destruction of the lip seal from the rear and impairment of the surface of the moving parts and of the guide bore 2. The sealing of the oil pressure chamber 5 standing under pressure against the atmosphere takes place by means of the lip 7.

The lip seal 7 is designed in such a manner that the operating pressure that prevails in front of the seal in the oil chamber 22 spreads or forces the two sealing lips 8 and 9 apart to such an extent until these are pressed in the groove 6 and against the moving piston rod 3 and thereby bring about the sealing. Since this pressing on is not sufficient in many cases of use or operation, particularly with small working pressures, a prestress or initial tension element 11 was inserted between the two sealing lips 8 and 9, which initial tension element is intended to bring about an adequate prestress and therewith adequate sealing. The lip seal 7 which is made of elastomer, or respectively polymer, according to the theory acts under high pressure like a viscous fluid and therewith strives to flow into the ring slot or annular clearance 23 on the side (which is turned away from pressure) of the seal between the housing 1 and the piston rod 3. To avoid this, a support ring 14 made of a dimensionally stable material is arranged in the lip seal 7, which support ring prevents a gap extrusion (damage of the sealing). The protection element 17 precedes lined up in front of the lip seal 7, the elastic lip 20 of the protection element 17 pointing to the oil pressure chamber 5 and acting with prestress upon the piston rod 3. The lip 20 contains equalization holes 21, or respectively, slots 32, of definite size, via which holes, or respectively, slots, the pressure equalization between the oil chambers 5 and 22 takes place. During the moving-out motion of the piston rod 3 the dirt particles that have been carried along in the oil cannot be pulled under the active sealing lip 9 and damage the latter as is the case with customary sealing systems, since the protection element 17 keeps dirt particles away from the lip seal 7. No dirt particles can get under the sealing lip 9 via the equalization bore 21 in the protection element 17 for the reason that with imperviousness of the lip seal 7 no correspondingly large oil flow occurs between oil chambers 5 and 22, which oil flow might transport dirt particles along. In addition the protection element 17 serves to create an oil chamber 22 in front of the lip seal, in which the pressure puslations which act in the hydraulic system are extensively weakened, respectively, damped, so that oscillations of the lip seal 7, which oscillations likewise could lead to untightness of the sealing, are extensively avoided. In addition it is intended by means of the preceding protection element 17 to avoid air bubbles from seeping or floating into the bled or vented oil chamber 22. Little air bubbles that have got under the sealing lip of the seal, under pressure along with the oil, are removed from out of the sealing area by virtue of their low viscosity even when the oil surrounding them is held back. During this procedure the little air bubbles expand directly behind the sealing lip and tear grooves or furrows into the sealing and also into the metal guide element. Another consequence of air bubbles getting into the oil chamber 22 is the so called Diesel effect which comes about when the air with high velocity is compressed and therewith becomes so powerfully heated that the air-gas mixture, which comes about through evaporation of volatile oil particles, itself ignites. During this procedure, in addition, high, local pressure peaks arise, which results in particularly heavy damages to the seals. The bleeding or venting of the oil chamber 22 via the bore 25 and the venting screw 24 takes place only once before beginning of operation of the working tools, so that the oil chamber 22 remains continuously filled with oil.

FIG. 2 shows a sealing system according to the invention of a piston seal with which the protection elements 51 and 55 protect the piston guide rings 43 and 42 as well as the piston seal 47 against the previously described negative influence factors, dirt, pressure fluctuations, and little air bubbles.

We claim:

1. In a sealing for back and forth moving machine elements, particularly for the sealing of axially back and forth moving piston rods for hydraulic cylinders, with a seal which seals against a housing as well as against the axially back and forth moving piston rod, an additional sealing protection element arranged between the seal and the oil pressure chamber of the cylinder, and a stripper turned toward the atmosphere, the improvement wherein the additional sealing protection element comprises a preceding protection element formed with a lip, said lip being directed toward said oil pressure chamber, the seal constitutes a lip seal, the latter in cooperation with and between the piston rod, the housing and said preceding protection element define another oil chamber, said back and forth moving piston rod and said housing constitute relatively moveable elements, said lip of said preceding protection element contacts one of said relatively moveable elements and is formed with openings, said openings form a connection between said pressure oil chamber and said another oil chamber between said preceding protection element and said lip seal.

2. The sealing as set forth in claim 1, wherein said openings of said lip of said preceding protection element constitute equalization bores of defined size.

3. The sealing as set forth in claims 1, wherein said openings of said preceding protection element are formed on a periphery thereof as axial grooves of definite size.

4. The sealing as set forth in claim 3, wherein said periphery is the outer periphery of said preceding protection element.

5. The sealing as set forth in claim 1, wherein said one of said relatively moveable elements is said back and forth moving piston rod.

6. The sealing as set forth in claim 5, wherein said openings of said preceding protection element are formed on a periphery thereof as axial grooves of definite size.

* * * * *

UNITED STATES PATENT AND TRADEMARK OFFICE
CERTIFICATE OF CORRECTION

PATENT NO. : 4,284,280
DATED : Issued: August 18, 1981
INVENTOR(S) : Claus Bertram et al It is certified that error appears in the above-identified patent and that said Letters Patent are hereby corrected as shown below:

ON THE TITLE PAGE:

Item [73] Assignee: after "Berlin" insert --and Königstein, respectively,--

Signed and Sealed this

Second Day of March 1982

[SEAL]

Attest:

GERALD J. MOSSINGHOFF

Attesting Officer    Commissioner of Patents and Trademarks